(12) United States Patent
Banks

(10) Patent No.: US 6,402,949 B1
(45) Date of Patent: Jun. 11, 2002

(54) PORTABLE WATER FILTRATION SYSTEM

(76) Inventor: Jed Ben Banks, 8523 S. Fairgrounds Rd., Stillwater, OK (US) 74074

( * ) Notice: Subject to any disclaimer, the term of this patent is extended or adjusted under 35 U.S.C. 154(b) by 0 days.

(21) Appl. No.: 09/883,061

(22) Filed: Jun. 15, 2001

(51) Int. Cl.[7] .......................... B01D 35/26; B01D 33/50; B01D 35/02; B01D 35/00
(52) U.S. Cl. .................... 210/257.1; 210/258; 210/411; 210/416.3
(58) Field of Search .............. 210/282, 416.3, 210/411, 258, 257.1

(56) References Cited

U.S. PATENT DOCUMENTS

| | | | | |
|---|---|---|---|---|
| 528,630 A | * | 11/1894 | Freise | |
| 582,403 A | * | 5/1897 | Stifel | |
| 582,440 A | * | 5/1897 | Stifel | |
| 623,894 A | * | 4/1899 | Freise | |
| 828,925 A | * | 8/1906 | Caverno | |
| 1,135,753 A | * | 4/1915 | Baldwin | |
| 1,723,564 A | * | 8/1929 | Lewis | |
| 3,291,308 A | * | 12/1966 | Headrick et al. | |
| 3,339,743 A | * | 9/1967 | Bealle | |
| 3,786,924 A | * | 1/1974 | Huffman | |
| 5,151,175 A | * | 9/1992 | Royal | |

FOREIGN PATENT DOCUMENTS

| | | | |
|---|---|---|---|
| FR | 2539048 | * | 7/1984 |
| JP | 09-057248 | * | 3/1997 |
| JP | 10-314726 | * | 12/1998 |

* cited by examiner

*Primary Examiner*—Thomas M. Lithgow
(74) *Attorney, Agent, or Firm*—Head, Johnson & Kachigian

(57) ABSTRACT

A portable water filtration system with two water reservoirs and a filter capable of meeting the drinking and cooking water needs of a family or small group of people. The portable water filtration system is also capable of back flushing the filter, thus increasing the filter life and efficiency of the filtration system.

7 Claims, 2 Drawing Sheets

PORTABLE WATER FILTRATION SYSTEM

REFERENCE TO PENDING APPLICATION

This application is not related to any pending applications.

REFERENCE TO MICROFICHE APPENDIX

This application is not referenced in any microfiche appendix.

TECHNICAL FIELD OF THE INVENTION

The present invention is related to the field of water filtration systems. In particular it provides a portable water filtration system which is also capable of back flushing the filter.

BACKGROUND OF THE INVENTION

In many remote areas of the United States and the world a source of potable water is not available. Drinking untreated water by the local residents and visitors can lead to numerous health problems including cholera and dysentery. One solution to the problem is to transport in water, however this can be time consuming and expensive. Another option is to filter or otherwise treat the water in the remote location, however, these remote locations typically do not have electrical power available. Therefore only simple manual filter systems can be used. Once the filters have been used several times, debris builds up in the filter blocking the filter and rendering it useless and impenetratable to the water. Another problem with the simple filter devices is that they are typically only capable of providing enough water for one individual. This makes them impractical for larger groups of people or families.

Another alternative for treating water would be through the use of chemicals, however, these chemicals can change the taste of the water making it unpalatable.

Purported improvements to water filtration systems are known and represented in the prior art. For example:

U.S. Pat. No. 4,828,698 entitled "Filtering Apparatus" issued on May 9, 1989 to James E. Jewell and Evan E. Koslow, subsequently assigned to Pall Corporation discloses a filter assembly comprising a housing having a liquid inlet and a liquid outlet and defining a liquid flow path between the inlet and the outlet; a generally cylindrical filter arrangement disposed within the housing in the liquid flow path and comprising a cylindrically shaped porous means for removing particulate contaminants from the liquid, a cylindrically shaped sorbent-containing means for removing chemical contaminants from the liquid, and a cylindrically shaped microporous means for removing microbiological contaminants from the liquid; and means for directing the liquid flow radially through the filter arrangement.

U.S. Pat. No. 4,902,411 entitled "Drinking Water Purifier" issued on Feb. 20, 1990 to Frank W. G. Lin discloses a water purifier to purify drinkable water, comprising a packed filter chamber, jet type oxygen dissolution chamber, UV lamp sterilization chamber, water circulation and drainage structure, water supply structure and a control circuit. Such an arrangement removes high polymer hydrocarbon pollutants, low polymer trihalo-methane pollutants, and other soluble or insoluble pollutants such as mineral substances, metal salts or other impurities in the water.

U.S. Pat. No. 5,130,015 entitled "Liquid Purifying Attachment Having Pressurizing Piston" issued on Jul. 14, 1992 to Kazua Simizu et al, subsequently assigned to Tomei Sagyo Co., Ltd. discloses a liquid purifying attachment for dispensing a liquid from a container, which includes a cylinder fluid-tightly attached to the container, and a piston fluid-tightly fitted in the cylinder bore such that the piston is slidably movable between a retracted and an advanced position, relative to the cylinder. The piston and the cylinder define a cylinder chamber into which ambient air is introduced upon movement of the piston toward the advanced position. The introduced air is compressed and fed into the container upon movement of the piston toward the retracted position, to deliver the liquid out of the container, through a filter disposed in a liquid delivery path which is exposed to the ambient air and communicates with the liquid mass.

U.S. Pat. No. 5,232,590 entitled "Water Filtration Apparatus" issued on Aug. 3, 1993 to Roger P. Reid discloses a water filtration apparatus with an internal by-pass for conducting water from a water source to a storage tank and from the storage tank through filter media to a tap. The apparatus includes a filter housing with an inlet port, and outlet port, and a combination inlet-outlet port connected to the storage tank. Water from the source flows slowly into the filter housing through the inlet port and through the combination port to the tank. Once the tap is opened, water flows from the storage tank, through the filter media, out the outlet port and out of the tap.

U.S. Pat. No. 5,362,385 entitled "Portable Water filtering Device" issued on Nov. 8, 1994 to Neal A. Klegerman and Richard Fuksa discloses a personal, portable water filtering device is provided for use in filtering water taken from public drinking fountains, public wash basins or other public water sources. The preferred device includes a flexible attachment means for engaging the outlet of a water fountain, a tube connecting the attachment piece to a pump disposed between two check valves, a filter disposed between or within the pump and a tube connecting the filter to a mouthpiece. The user inserts the attachment means into the outlet of a water fountain or standing water supply which allows water to proceed up the first tube and into the hand-pump. The user then squeezes the hand-pump which forces water through the filter and the filtered water exits through the mouthpiece into the user's mouth. The device is lightweight and collapsible and will fit into the back pocket of athletic wear worn by joggers or other athletes.

U.S. Pat. No. 5,580,447 entitled "Biocide Filter" issued on Dec. 3, 1996 to Sanford Platter et al, subsequently assigned to Sweetwater, Inc. discloses an efficient, low pressure drop biocide cartridge is provided for destroying viral and bacterial pathogens in water from untreated water sources along a lengthened flow pathway including a critical plenum for controlling the speed of water throughput. In a first pathway, water is percolated through a turbulatable bed of biocidally-effective material. In flow pathway, channeling and pressure drop are reduced by radial flow across a columnar bed presenting a large surface area at an outer diameter. The cartridge may be connected with a lightweight hand-held pump. A sealing strap is provided for wet storage of any biocide cartridge.

U.S. Pat. No. 5,733,448 entitled "Manually Pressurized Water Filtering Container" issued on Mar. 31, 1998 to Kamaljit S. Kaura discloses a container wherein two chambers in a container are separated by an easily replaced filter. One of the chambers is capable of being compressed so as to pressurize a water volume in the chamber which is to be filtered. The water is therefore forced through the filter into the second of the chambers where it is stored for use in a clean and drinkable form. The filter is made-up of a series of discs arranged to effectively remove particulate, chemical and other undesired contents of the water. The filtered water may be filtered to the molecular level providing an essentially sterile drinking water. The filter may also remove odor and taste components that are undesirable. The filter is constructed and held within the container in such a manner as to prevent seepage and leakage of the unfiltered water.

U.S. Pat. No. 5,928,506 entitled "Water Purifier For Drinking Water" issued on Jul. 27, 1999 to Kyung Suk Bae, subsequently assigned to Waters Co., Ltd. discloses a water purifier using common advantages of natural and forced types operated without an external electric power source, resulting in high efficiency of water purification. The apparatus for purifying water includes a first water-supply pipe for transporting running water with a predetermined pressure, a second water-supply pipe for pumping the running water to the highest position of the apparatus, a first purifying section for temporarily storing and purifying the water provided by the second water-supply pipe as water flows down by its own gravitational force, a second purifying section for temporarily storing and purifying the water passing through the first purifying section as water flows down by its own gravitation force, and a transparent storage section for storing the water passing through the second purifying section, wherein the first and second purifying sections detect the water levels which fill up from the transparent storage section to the first and/or second purifying sections, thereby control the inflow of water from the second water-supply pipe in accordance with the existing water levels in the first and second purifying sections.

U.S. Pat. No. 6,051,140 entitled "Water Decontaminating System and Method" issued on Apr. 18, 2000 to Cliff Perry discloses a portable point of use water decontaminating unit adapted to receive a flow of water from a faucet or other water source and pass the water through a filtering and decontaminating system to deliver the water as a continuous flow to an outlet. There is a pressure regulator to deliver the water at a proper volumetric flow rate, a pre-disinfectant filter system to receive the water from the pressure regulator and a post disinfectant filter section to filter the disinfectant and contaminants from the water. There is a disinfectant section comprising a disinfectant injector, and an elongate residence tube extending in successive coils around the interior of the container to receive the water from the disinfectant injection means and accomplish disinfection as the water travels through the residence tube.

BRIEF SUMMARY OF THE INVENTION

The present invention unlike the prior art can provide enough potable drinking water to meet the drinking and cooking needs of a family. It can be constructed in a lightweight and portable design so that it can be transported to remote locations for use. It also can be operated using only manual hand power without any need for electricity or other power. Also unlike the prior art it has the capability of back flushing the filter so that the filter life can be greatly extended.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
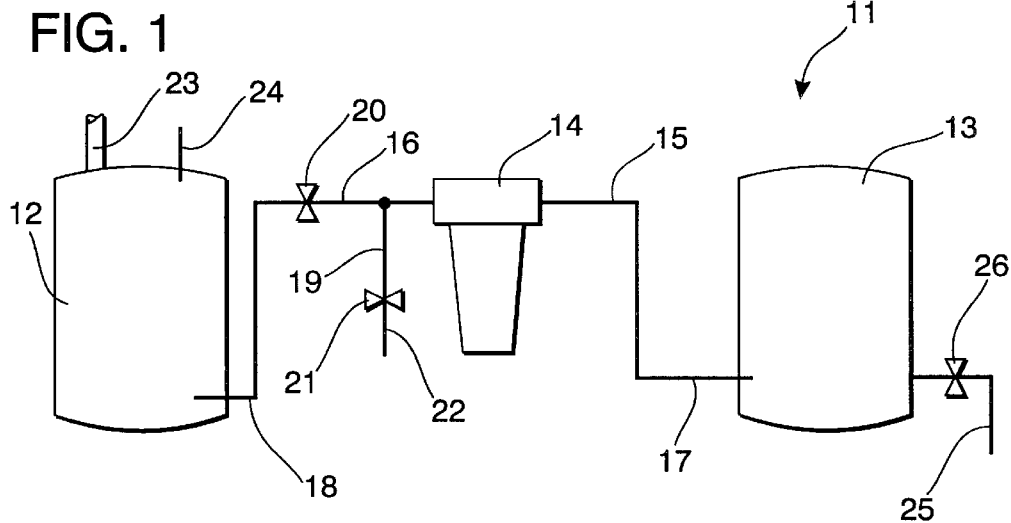
FIG. 1 is a schematic drawing of the basic present invention.

FIG. 1 shows a schematic diagram of one embodiment of the portable water filtering device 11. It has a draw water reservoir 12. The draw water reservoir 12 has a draw water reservoir inlet 23, a draw water reservoir pressure source 24 and a draw water reservoir outlet 18. The draw water reservoir outlet 18 is connected to a draw water filter line 16 which has a draw water/filter valve 20. The draw water/filter valve 20 is capable of isolating the draw water reservoir from the rest of the portable water filtering device 11. The opposite end of the draw water filter line 16 is connected to the filter 14. There is a back flush discharge line 19 which is connected to the draw water/filter line 16 between the draw water/filter valve 20 and the filter 14. The back flush discharge line 19 has a back flush discharge valve 21 and a back flush discharge 22. There is a filter water/filter line 15 coming out of the filter and leading to the filter water reservoir 13. The filter water/filter line 15 enters the filter water reservoir 13 through the filter water reservoir inlet 17. There is also a filter water/reservoir outlet valve 26 and a filter water reservoir outlet 25 attached to the filtered water reservoir 13. The portable water filtering device 11 is constructed such that each of the elements are in fluid communication with each other and so that the portable water filtering device 11 can contain pressure.

The size and type of filter 14 can vary depending on what is needed to be removed from the water. However in order to remove organics down to the size of cholera it is necessary to use a filter 14 with a 0.5 micron pore size or smaller.

When the portable water filtering device 11 is used draw water is poured into the draw water reservoir 12 through the draw water reservoir inlet 23. The draw water reservoir inlet 23 is then closed to seal the system. The back flush discharge valve 21 and the filter water reservoir outlet valve 26 are in the closed position. The draw water filter valve 20 is in the open position. The pressure inside the portable water filtering device 11 is then increased by the draw water reservoir pressure source 24. The draw water reservoir pressure source 24 does this by pumping air into the top of the draw water reservoir 12. The draw water reservoir pressure source 24 can be a hand pump as commonly found in a garden sprayer, such as found in U.S. Pat. No. 3,993,245, Colin P. Smith. Among other things, it could also be an ordinary bicycle tire pump with a valve stem on the draw water reservoir 12. The pressure created inside the draw water reservoir 12 above the draw water forces the draw water through the draw water reservoir outlet 18 and through the draw water filter line 16 and draw water filter valve 20. The draw water then enters the filter 14 where the impurities are removed from the water. The water then continues on to the filter water/filter line 15 through the filter water reservoir inlet 17 and into the filter water reservoir 13.

As the water level in the filtered water reservoir 13 rises, the pressure inside the filter water reservoir 13 increases. Once the majority of the draw water has been pushed through the filter 14, the draw water filter valve 20 is then closed. At this time, filtered water can be drawn from the filtered water reservoir 13 by operating the filter water reservoir outlet valve 26. The pressure captured in the filtered water reservoir 13 helps dispense the filtered water out through the filtered water reservoir outlet.

Once the filter 14 has been used several times it may become necessary to back flush the filter 14 in order to open the pores and help increase the flow of the water through the filter 14. In order to back flush the filter 14, the filtered water reservoir 13 is filled and charged as discussed above. Once the filtered water reservoir 13 is filled and charged and the draw water filter valve 20 is closed, then the back flush discharge valve 21 is opened. The pressure captured inside the filtered water reservoir 13 then forces the water out of the filtered water reservoir 13 through the filtered water reservoir inlet 17 into the filtered water/filter line 15 and through the filter 14. The water is pushed through the filter 14 in the opposite direction that the water flows when the system is being charged. As the water flows through the filter 14 it takes the impurities out of the filter 14. The water then flows out of the filter 14 into the draw water filter line 16 through the back flush discharge line 19 and through the back flush discharge valve 21 and out the back flush discharge 22.

Figure 2:
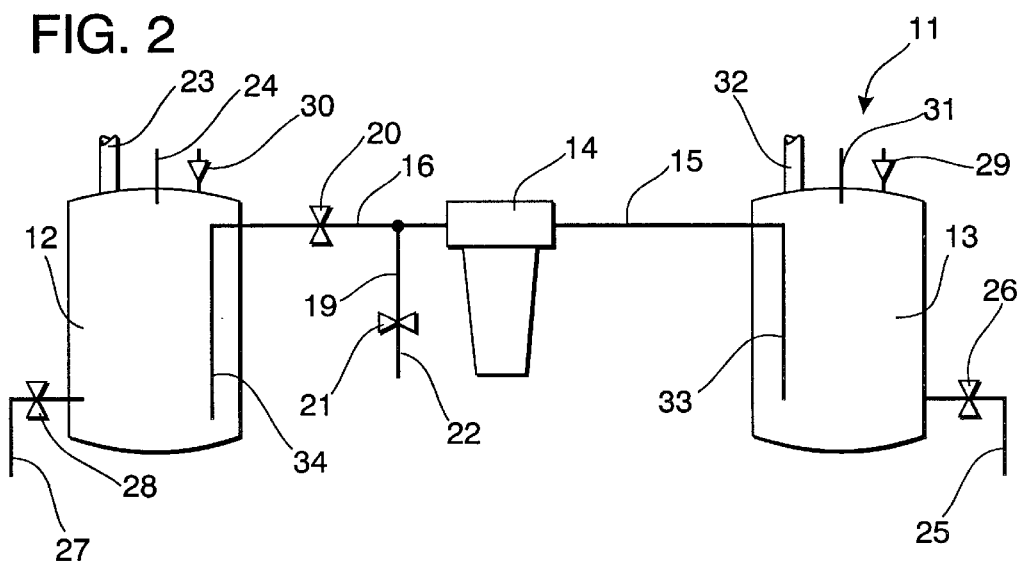
FIG. 2 is a schematic drawing of the present invention with several alternative embodiments.

FIG. 2 shows the portable water filtering device 11 as shown in FIG. 1 with some alternative embodiments or additional equipment added to the system.

FIG. 2 shows a draw water reservoir pressure release valve 30 attached to the draw water reservoir 12. It also shows a filtered water reservoir pressure release valve 29 attached to the filtered water reservoir 13. A pressure relief valve can be added to either or both of the reservoirs in order to prevent over pressurizing the portable water filtering device 11.

FIG. 2 also shows a draw water reservoir outlet 27 and draw water reservoir outlet valve 28 added near the bottom of the draw water reservoir 12. This could be added to help drain the draw water reservoir 12 without pressurizing the portable water filtering device 11.

FIG. 2 shows another alternate embodiment of adding a filtered water reservoir pressure source 31 to the filtered water reservoir 13. This could aid in creating additional pressure for back flushing the filter 14 and also to assist in dispensing the water from the filtered water reservoir 13 through the filtered water reservoir outlet 25.

Another embodiment of the present invention shown in FIG. 2 is having the draw water/filter line 16 enter the draw water reservoir 12 at or near the top of the reservoir and then having a draw water reservoir drop line 34 extend down from near the top of the reservoir down to near the bottom of the draw water reservoir 12. This is opposed to having the draw water/filter line 16 enter near the bottom of the draw water reservoir 12 as shown in FIG. 1.

FIG. 2 also shows the same idea applied to the filter water reservoir 13 wherein the filter water/water line 15 enters the filtered water reservoir 13 at or near the top of the reservoir and has a filtered water reservoir drop line 33 which extends from at or near the top of the filtered water reservoir 13 to near the bottom of the filtered water reservoir 13.

FIG. 2 shows another additional embodiment of the present invention of adding a filtered water reservoir access port 32 to the filtered water reservoir 13. The filtered water reservoir access port 32 would be an opening which could be sealed when the portable water filtering device 11 is in use. The filtered water reservoir access port 32 could provide the operator of the portable water filtering device 11 with access in order to clean the interior of the filtered water reservoir 13.

Figure 3:
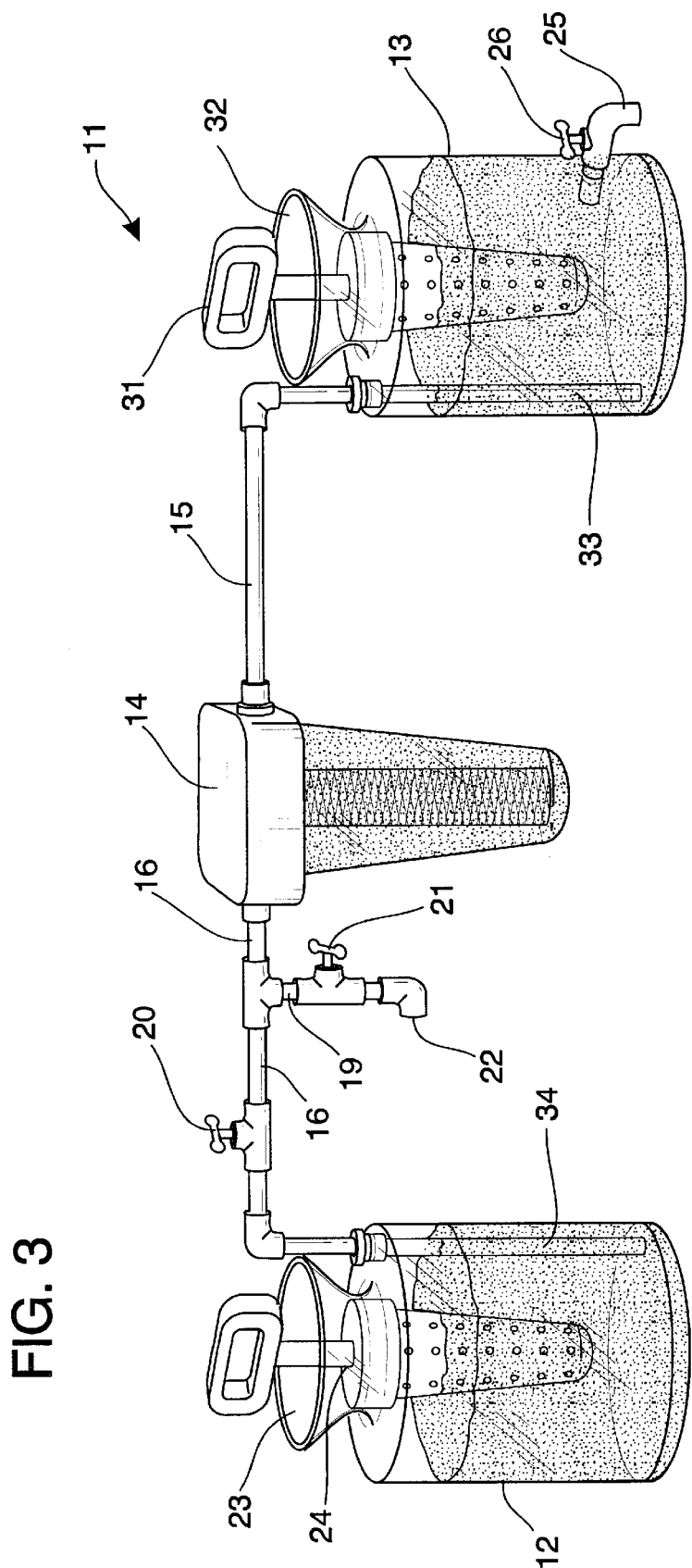
FIG. 3 shows another embodiment of the present invention.

FIG. 3 shows another embodiment of the present invention where the portable water filtration device 11 is constructed using two garden hand pump sprayers as the draw water reservoir 12 and filtered water reservoir 13. The numbered elements in FIG. 3 correspond to those found in FIGS. 1 and 2. The operation of the portable water filtration device 11 as shown in FIG. 3 would be the same as discussed above.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A portable water filtration system comprising:

a draw water reservoir, a filtered water reservoir and a filter in fluid communication between the draw water reservoir and the filtered water reservoir;

wherein the draw water reservoir, filtered water reservoir and filter form a volume which is capable of being sealed from the atmosphere;

wherein there is a first valve in fluid communication between the draw water reservoir and the filter capable of terminating the fluid communication between the draw water reservoir and the filter;

wherein there is a branch line in fluid communication between the filter and the first valve;

wherein there is a second valve on the branch line capable of opening the branch line to fluid communication with the atmosphere;

wherein the draw water reservoir comprises a draw water reservoir inlet, a draw water reservoir outlet and a draw water reservoir pressure source;

wherein the filtered water reservoir comprises an inlet and an outlet with a valve capable of opening the filtered water reservoir to fluid communication with the atmosphere.

2. A portable water filtration system as claimed in claim 1 wherein the pressure source is a hand powered air pump.

3. A portable water filtration system as claimed in claim 1 wherein the draw water reservoir has a pressure relief valve.

4. A portable water filtration system as claimed in claim 1 wherein the filtered water reservoir has a pressure relief valve.

5. A portable water filtration system as claimed in claim 1 wherein the filtered water reservoir has a pressure source.

6. A portable water filtration system as claimed in claim 5 wherein the filtered water reservoir pressure source is a hand powered air pump.

7. A portable water filtration system as claimed in claim 1 wherein the filter has a pore size of no greater than 0.5 microns.

* * * * *